US012801955B2

(12) United States Patent
Holtman et al.

(10) Patent No.: US 12,801,955 B2
(45) Date of Patent: Nov. 17, 2026

(54) SYSTEM AND METHOD FOR PERFORMING SEQUENTIAL MULTI-MODEL ESTIMATION TO IMPROVE DATA COVERAGE

(71) Applicant: JPMorgan Chase Bank, N.A., New York, NY (US)

(72) Inventors: Matthew Holtman, Swarthmore, PA (US); Erica Dawson, Baltimore, MD (US); Shi Ouyang, Frisco, TX (US); Patrick Murphy, Wilmington, DE (US); Vishwa Panagari, Sterling, VA (US); Abel Saenz, Dallas, TX (US); Mark Gabriel, Jersey City, NJ (US); Eric Wang, McLean, VA (US); Huai Shu, Berkeley Heights, NJ (US); Jalen Walker, Chicago, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 715 days.

(21) Appl. No.: 18/215,638

(22) Filed: Jun. 28, 2023

(65) Prior Publication Data

US 2024/0054372 A1 Feb. 15, 2024

Related U.S. Application Data

(60) Provisional application No. 63/396,441, filed on Aug. 9, 2022.

(51) Int. Cl.
*G06N 7/01* (2023.01)

(52) U.S. Cl.
CPC .................................... *G06N 7/01* (2023.01)

(58) Field of Classification Search
CPC ........................................................ G06N 7/01
See application file for complete search history.

(56) References Cited

U.S. PATENT DOCUMENTS

| | | | | |
|---|---|---|---|---|
| 2019/0043070 | A1* | 2/2019 | Merrill | G06Q 30/0205 |
| 2021/0232920 | A1* | 7/2021 | Parangi | G06N 3/0455 |

OTHER PUBLICATIONS

Ioan Voicu, Using First Name Information to Improve Race and Ethnicity Classification; Mar. 21, 2018; American Statistical Association—Taylor & Francis (Year: 2018).*

(Continued)

*Primary Examiner* — David Yi
*Assistant Examiner* — Paul Coleman
(74) *Attorney, Agent, or Firm* — Greenblum & Bernstein, P.L.C.

(57) ABSTRACT

A method for performing sequential multi-model race estimation is provided. The method includes acquiring a dataset of identification information of individuals; executing a first model within a multi-model system for estimating a race for each of the individuals included in the dataset; subsequent to executing the first model, executing a second model within the multi-model system for estimating a race for individuals included in the dataset that were unable to be estimated via the first model; and subsequent to executing the second model, executing a third model within the multi-model system for estimating a race for individuals included in the dataset that were unable to be estimated via the first model and the second model, in which the third model estimates a race for individuals with insufficient data fields.

13 Claims, 6 Drawing Sheets

(56) References Cited

OTHER PUBLICATIONS

Coldman, Andrew et al., "The classification of ethnic status using name information", Journal of Epidemiology and Community Health, 1988, vol. 42, pp. 390-395.
Consumer Financial Protection Bureau, Summer 2014, "Using publicly available information to proxy for unidentified race and ethnicity".
Tzioumis, Konstantinos, "Data Descriptor: Demographic aspects of first names", Scientific Data, Published Mar. 6, 2018.
Elliott, Marc et al., "Using the Census Bureau's surname list to improve estimates of race/ethnicity and associated disparaties", published Apr. 10, 2009.
Voicu, Ioan, "Using First Name Information to Improve Race and Ethnicity Classification", 2018 issued in Statistics and Public Policy (ISSN:2330-443X; https://www.tandfonline.com/Ioi/uspp20).

* cited by examiner

FIG 6

BISG

| Metric | Overall |
| --- | --- |
| Accuracy | 89.14% |
| Coverage | 68.12% |

BIFSG / BISG

| Metric | Overall |
| --- | --- |
| Accuracy | 89.59% |
| Coverage | 73.33% |

BIFSG / BISG / ML

| Metric | Overall |
| --- | --- |
| Accuracy | 89.63% |
| Coverage | 82.30% |

SYSTEM AND METHOD FOR PERFORMING SEQUENTIAL MULTI-MODEL ESTIMATION TO IMPROVE DATA COVERAGE

CROSS-REFERENCE TO RELATED APPLICATION (S)

This application claims the benefit of U.S. Provisional Patent Application No. 63/396,441, filed Aug. 9, 2022, which is hereby incorporated by reference in its entirety.

TECHNICAL FIELD

This disclosure generally relates to a system and method for providing a sequential multi-model processing to increase data processing coverage for predicting race and/or gender from a dataset.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Various governmental laws were put in place to protect families and communities from discrimination, including, but not limited to Equal Credit Opportunities Act (ECOA), Regulation B and the like. However, private businesses are generally prohibited from inquiring about race, color, religion, national origin or sex of a customer or applicant. In order to conduct proper analysis to identify discriminatory practices, a set of demographic estimation techniques was created using publicly available data. These techniques use a predictive model to assign race and gender to customers or prospects based on proxy data. The available techniques rely on the Bayesian Improved Surname Geocoding (BISG) method, which involves the calculation of a set of probabilities of race and ethnicity assignment based on the subject's surname and residence location. Although the current BISG method provides a probability of race and ethnicity within a certain level of accuracy, the current BISG method is limited in the amount of data that it may successfully process or cover, leaving a significant amount of data that are unprocessed for limited applicability its findings.

SUMMARY

According to an aspect of the present disclosure, a method for performing sequential multi-model race estimation is provided. The method includes performing, using a processor and a memory: acquiring a dataset of identification information of individuals; executing a first model within a multi-model system for estimating a race for each of the individuals included in the dataset; subsequent to executing the first model, executing a second model within the multi-model system for estimating a race for individuals included in the dataset that were unable to be estimated via the first model; and subsequent to executing the second model, executing a third model within the multi-model system for estimating a race for individuals included in the dataset that were unable to be estimated via the first model and the second model, in which the third model estimates a race for individuals with insufficient data fields.

According to another aspect of the present disclosure, the method further includes performing one or more pre-processing operations on the data set of identification information of the individuals.

According to another aspect of the present disclosure, the first model is a BIFSG (new Bayesian Improved First Name Surname Geocoding) model.

According to yet another aspect of the present disclosure, the second model is a BISG (Bayesian Improved Surname Geocoding) model.

According to another aspect of the present disclosure, the third model is a machine learning model.

According to a further aspect of the present disclosure, the second model is being executed prior to completion of the first model.

According to yet another aspect of the present disclosure, the third model is being executed prior to completion of the second model.

According to a further aspect of the present disclosure, the second model is executed upon completion of the first model.

According to another aspect of the present disclosure, the third mode is executed upon completion of the second model.

According to a further aspect of the present disclosure, the first model is unable to estimate a race for individuals with insufficient data fields.

According to a further aspect of the present disclosure, the second model is unable to estimate a race for individuals with insufficient data fields.

According to a further aspect of the present disclosure, the first model requires more data fields than the second model for performing the estimating.

According to a further aspect of the present disclosure, accuracy and coverage of an estimate provided by the first model are improved upon execution of the second model.

According to a further aspect of the present disclosure, accuracy and coverage of an estimate provided by the second model are improved upon execution of the third model.

According to another aspect of the present disclosure, a system for performing sequential multi-model race estimation is disclosed. The system includes at least one processor; at least one memory; and at least one communication circuit. The at least one processor is configured to perform: acquiring a dataset of identification information of individuals; executing a first model within a multi-model system for estimating a race for each of the individuals included in the dataset; subsequent to executing the first model, executing a second model within the multi-model system for estimating a race for individuals included in the dataset that were unable to be estimated via the first model; and subsequent to executing the second model, executing a third model within the multi-model system for estimating a race for individuals included in the dataset that were unable to be estimated via the first model and the second model, in which the third model estimates a race for individuals with insufficient data fields.

According to another aspect of the present disclosure, a non-transitory computer readable storage medium that stores a computer program for performing sequential multi-model race estimation is disclosed. The computer program, when executed by a processor, causing a system to perform a process including acquiring a dataset of identification information of individuals; executing a first model within a multi-model system for estimating a race for each of the individuals included in the dataset; subsequent to executing the first model, executing a second model within the multi-model system for estimating a race for individuals included in the dataset that were unable to be estimated via the first model; and subsequent to executing the second model, executing a third model within the multi-model system for estimating a race for individuals included in the dataset that were unable to be estimated via the first model and the second model, in which the third model estimates a race for individuals with insufficient data fields.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 6 illustrates data coverage comparisons in accordance with an exemplary embodiment.

DETAILED DESCRIPTION

Figure 1:
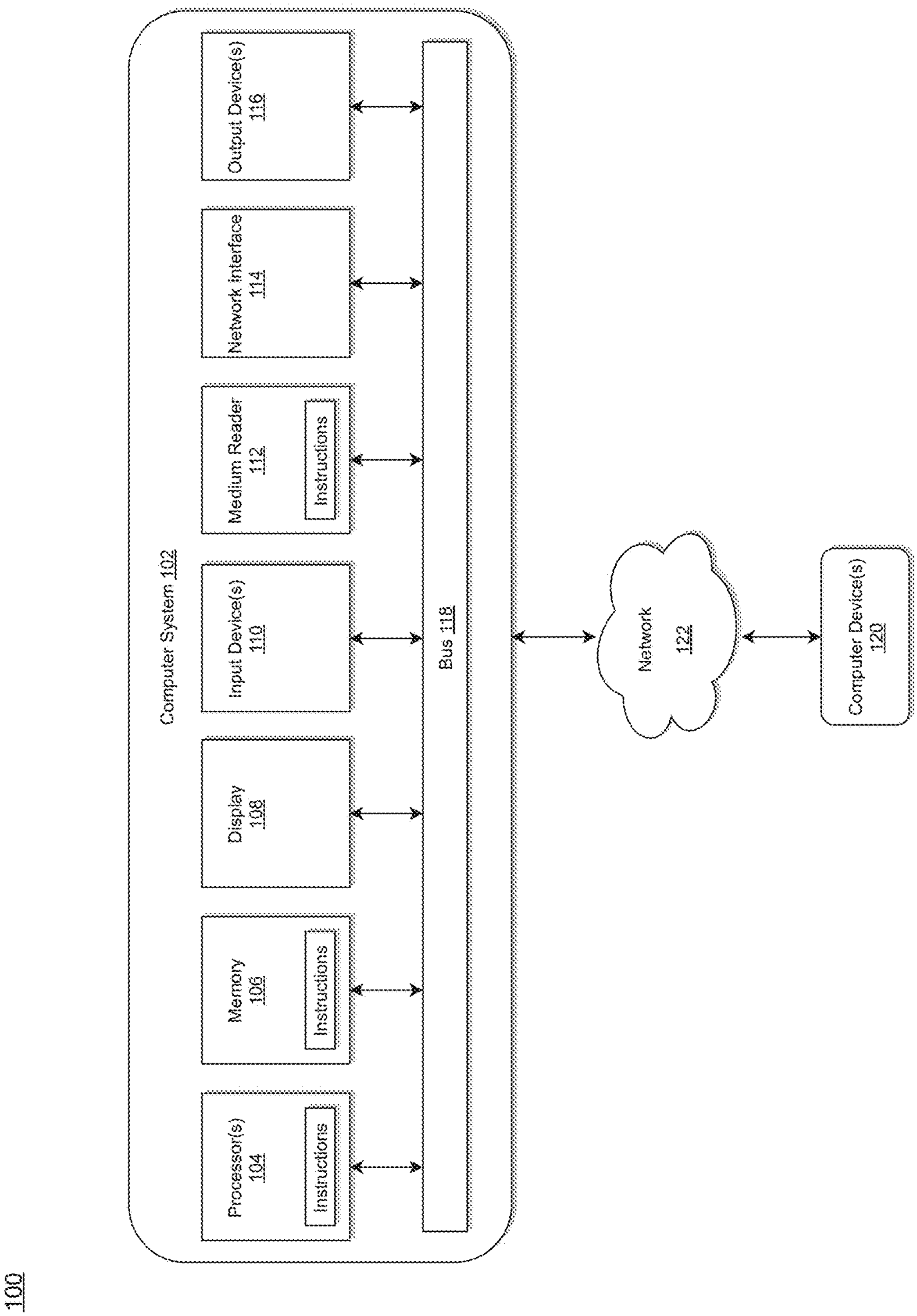
FIG. 1 illustrates a computer system for implementing a multi-model estimation modeling system (MMEMS) in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a multi-model estimation modeling system (MMEMS) in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing and an operation mode having parallel processing capabilities. Virtual computer system processing can be constructed to implement one or more of the methods or functionality as described herein, and a processor described herein may be used to support a virtual processing environment.

Figure 2:
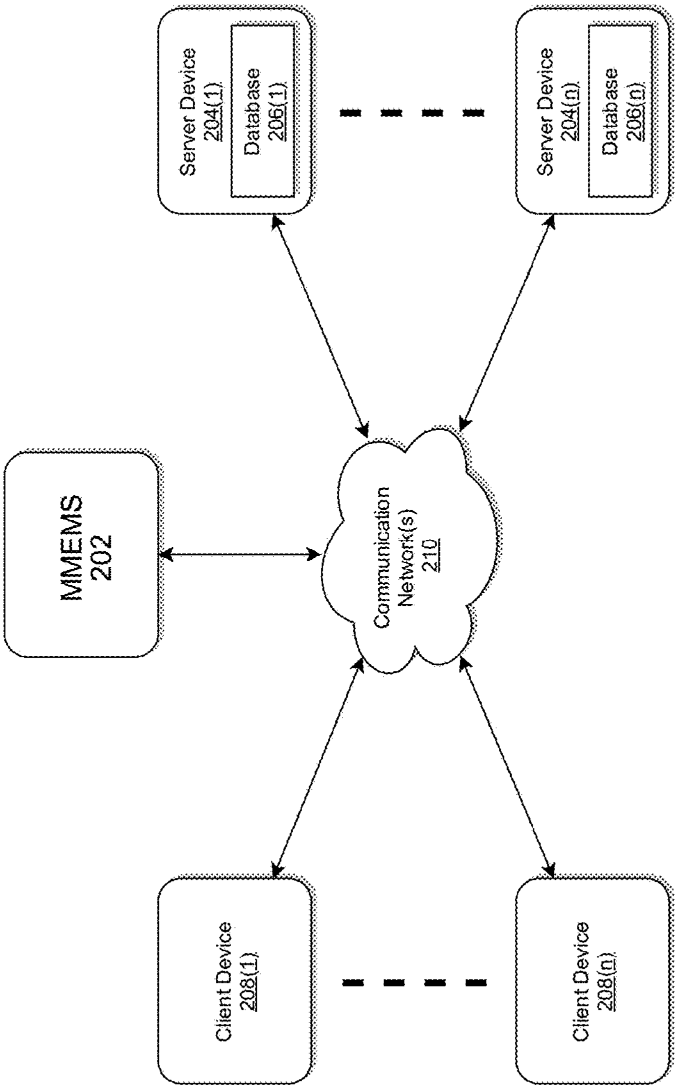
FIG. 2 illustrates an exemplary diagram of a network environment with a MMEMS in accordance with an exemplary embodiment.

FIG. 2 illustrates an exemplary diagram of a network environment with a MMEMS in accordance with an exemplary embodiment.

A MMEMS 202 may be implemented with one or more computer systems similar to the computer system 102 as described with respect to FIG. 1.

The MMEMS 202 may store one or more applications that can include executable instructions that, when executed by the MMEMS 202, cause the MMEMS 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the MMEMS 202 itself, may be located in virtual server(s) running in a cloud-based computing environment rather than being tied to one or more specific physical network computing devices. Also, the application(s) may be running in one or more virtual machines (VMs) executing on the MMEMS 202. Additionally, in one or more embodiments of this technology, virtual machine(s) running on the MMEMS 202 may be managed or supervised by a hypervisor.

In the network environment 200 of FIG. 2, the MMEMS 202 is coupled to a plurality of server devices **204(1)-204(*n*) that hosts a plurality of databases 206(1)-206(*n*), and also to a plurality of client devices 208(1)-208(*n*) via communication network(s) 210. According to exemplary aspects, databases 206(1)-206(*n*) may be configured to store data that relates to distributed ledgers, blockchains, user account identifiers, biller account identifiers, and payment provider identifiers. A communication interface of the MMEMS 202, such as the network interface 114 of the computer system 102 of FIG. 1, operatively couples and communicates between the MMEMS 202, the server devices 204(1)-204(*n*), and/or the client devices 208(1)-208(*n*), which are all coupled together by the communication network(s) 210**, although other types and/or numbers of communication networks or systems with other types and/or numbers of connections and/or configurations to other devices and/or elements may also be used.

The communication network(s) 210 may be the same or similar to the network 122 as described with respect to FIG. 1, although the MMEMS 202, the server devices **204(1)-204(*n*), and/or the client devices 208(1)-208(*n*) may be coupled together via other topologies. Additionally, the network environment 200** may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The MMEMS 202 may be a standalone device or integrated with one or more other devices or apparatuses, such as one or more of the server devices **204(1)-204(*n*), for example. In one particular example, the MMEMS 202 may be hosted by one of the server devices 204(1)-204(*n*), and other arrangements are also possible. Moreover, one or more of the devices of the MMEMS 202** may be in the same or a different communication network including one or more public, private, or cloud networks, for example.

The plurality of server devices **204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. The server devices 204(1)-204(*n*) in this example may process requests received from the MMEMS 202 via the communication network(s) 210** according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices **204(1)-204(*n*) may be hardware or software or may represent a system with multiple servers in a pool, which may include internal or external networks. The server devices 204(1)-204(*n*) hosts the databases 206(1)-206(*n*)** that are configured to store metadata sets, data quality rules, and newly generated data.

Although the server devices **204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*)** operates to manage and/or otherwise coordinate operations of the other network computing devices.

The server devices **204(1)-204(*n*)** may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(*n*) or other client devices 208(1)-208(*n*).

According to exemplary embodiments, the client devices 208(1)-208(*n*) in this example may include any type of computing device that can facilitate the implementation of the MMEMS 202 that may efficiently provide a platform for implementing a cloud native MMEMS module, but the disclosure is not limited thereto.

The client devices 208(1)-208(*n*) may run interface applications, such as standard web browsers or standalone client applications, which may provide an interface to communicate with the MMEMS 202 via the communication network(s) 210 in order to communicate user requests. The client devices 208(1)-208(*n*) may further include, among other features, a display device, such as a display screen or touchscreen, and/or an input device, such as a keyboard, for example.

Although the exemplary network environment 200 with the MMEMS 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the MMEMS 202, the server devices 204(1)-204(*n*), or the client devices 208(1)-208(*n*), for example, may be configured to operate as virtual instances on the same physical machine. For example, one or more of the MMEMS 202, the server devices 204(1)-204(*n*), or the client devices 208(1)-208(*n*) may operate on the same physical device rather than as separate devices communicating through communication network(s) 210. Additionally, there may be more or fewer MMEMS 202, server devices 204(1)-204(*n*), or client devices 208(1)-208(*n*) than illustrated in FIG. 2. According to exemplary embodiments, the MMEMS 202 may be configured to send code at run-time to remote server devices 204(1)-204(*n*), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
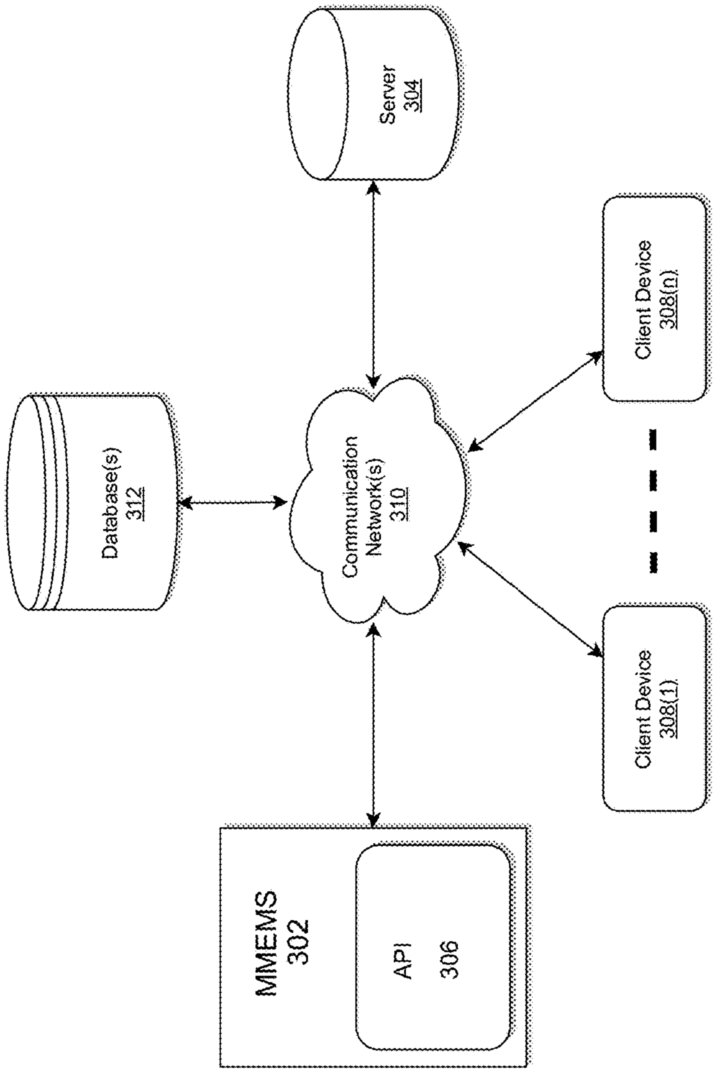
FIG. 3 illustrates a system diagram for implementing a MMEMS in accordance with an exemplary embodiment.

FIG. 3 illustrates a system diagram for implementing a MMEMS in accordance with an exemplary embodiment.

As illustrated in FIG. 3, the system 300 may include a MMEMS 302 within which a group of API modules 306 is embedded, a server 304, a database(s) 312, a plurality of client devices 308(1) . . . 308(*n*), and a communication network 310.

According to exemplary embodiments, the MMEMS 302 including the API modules 306 may be connected to the server 304, and the database(s) 312 via the communication network 310. Although there is only one database has been illustrated, the disclosure is not limited thereto. Any number of databases may be utilized. The MMEMS 302 may also be connected to the plurality of client devices 308(1) . . . 308(*n*) via the communication network 310, but the disclosure is not limited thereto.

According to exemplary embodiment, the MMEMS 302 is described and shown in FIG. 3 as including the API modules 306, although it may include other rules, policies, modules, databases, or applications, for example. According to exemplary embodiments, the database(s) 312 may be embedded within the MMEMS 302. According to exemplary embodiments, the database(s) 312 may be configured to store configuration details data corresponding to a desired data to be fetched from one or more data sources, user information data etc., but the disclosure is not limited thereto.

According to exemplary embodiments, the API modules 306 may be configured to receive real-time feed of data or data at predetermined intervals from the plurality of client devices 308(1) . . . 308(*n*) via the communication network 310.

The API modules 306 may be configured to implement a user interface (UI) platform that is configured to enable MMEMS as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(*n*) are illustrated as being in communication with the MMEMS 302. In this regard, the plurality of client devices 308(1) . . . 308(*n*) may be "clients" of the MMEMS 302 and are described herein as such. Nevertheless, it is to be known and understood that the plurality of client devices 308(1) . . . 308(*n*) need not necessarily be "clients" of the MMEMS 302, or any entity described in association therewith herein. Any additional or alternative relationship may exist between either or both of the plurality of client devices 308(1) . . . 308(*n*) and the MMEMS 302, or no relationship may exist.

The first client device 308(1) may be, for example, a smart phone. Of course, the first client device 308(1) may be any additional device described herein. The second client device 308(*n*) may be, for example, a personal computer (PC). Of course, the second client device 308(*n*) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(*n*) may communicate with the MMEMS 302 via broadband or cellular communication. Of course, these embodiments are merely exemplary and are not limiting or exhaustive.

The computing device 301 may be the same or similar to any one of the client devices 208(1)-208(*n*) as described with respect to FIG. 2, including any features or combination of features described with respect thereto. The MMEMS 302 may be the same or similar to the MMEMS 202 as described with respect to FIG. 2, including any features or combination of features described with respect thereto.

Figure 4:
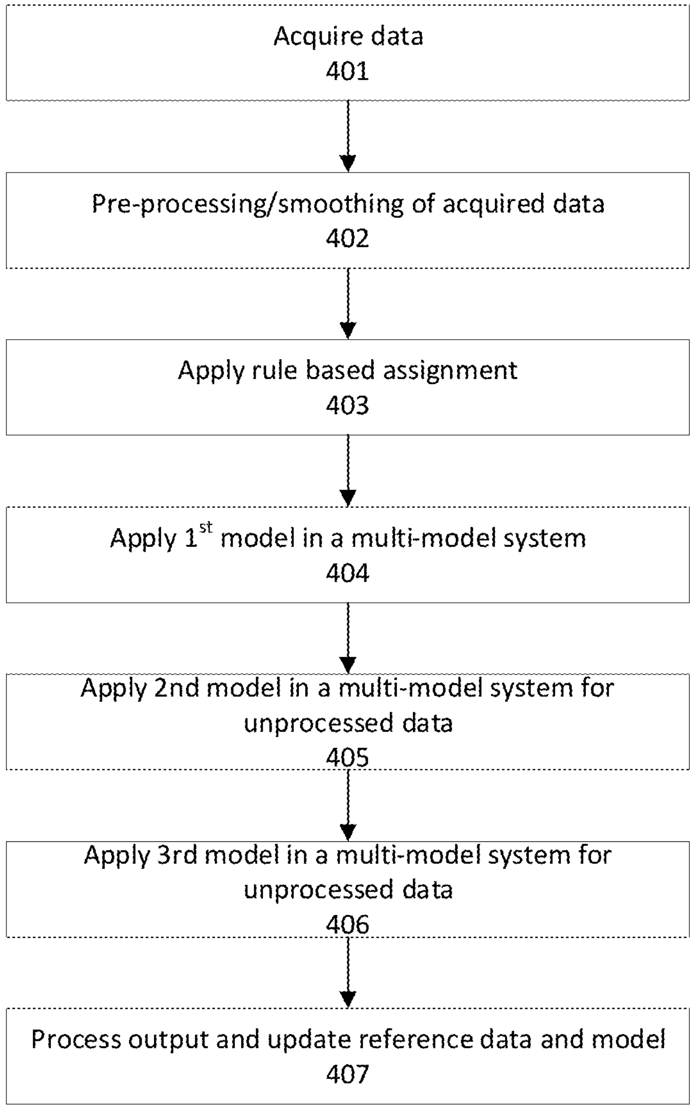
FIG. 4 illustrates a method for performing a multi-model data processing for calculating a prediction of race and gender of a customer dataset in accordance with an exemplary embodiment.

FIG. 4 illustrates a method for performing a multi-model data processing for calculating a prediction of race and gender of a customer dataset in accordance with an exemplary embodiment.

In using the BISG method for calculating a probability of race and/or gender, a common barrier is low estimation coverage (e.g., statistical support) providing for low sample size in some sub-samples, limiting its applicability and effectiveness. According to exemplary aspects, a proxy method may be utilized to increase data coverage or increase amount of data that may be calculated or processed. In an example, the proxy method may refer to one or more nested ensemble models using non-missing data elements when available. Further, machine learning may be applied to the proxy method to produce a large increase in estimation coverage without sacrifice to any of precision, accuracy or recall. In an example, estimation coverage may be increased to about 20%. However, aspects of the present disclosure are not limited thereto, such that the estimation coverage may be increased greater or lesser than such an amount.

In operation 401, personal identification information (PII) may be acquired for a customer or user dataset. In an example, PII may be collected from a variety data sources. Data sources may include privately sourced information, such as information of customers or users, or may be publicly available information. According to exemplary aspects, the PII acquired may include one or more of a first name, a last name, a pre-fix, a suffix, geographic information and the like. However, aspects of the present disclosure are not limited thereto, such that additional data may be collected.

In operation 402, one or more pre-processing or smoothing of the acquired data may be performed. For example, extraneous spacing and/or grammar may be removed. In addition, certain pre-fixes, suffixes, titles (e.g., Dr., Esq., PhD. and the like) may also be removed. Moreover, duplicate data may also be identified and removed from further processing. In another example, users or customers may be grouped according to certain geographic regions or markets. However, aspects of the present disclosure are not limited thereto, such that additional or less pre-processing may be performed on the acquired data. Further, different pre-processing or smoothing operations may be performed for a corresponding model included in the MMEMS.

In operation 403, one or more rule-based assignment may be performed. In an example, rule-based assignment may assign a race and/or gender to a person prior to being processed by the MMEMS. For example, if the PII includes Miss, Ms. or Mrs. as a prefix, the rule-based assignment may attribute a female gender even before name field or any other data field included in the PII is processed. In another example, if an organization processing the PII of the respective person is aware of the race and/or gender of the person (e.g., based on photos or in-person interaction), race and/or gender may be assigned to the respective person without being processed by the MMEMS. However, aspects of the present disclosure are not limited thereto, such that other rule-based assignments may be performed. Further, in an example, the rule-based assignment may be an optional step that may or may not be applied.

In operation 404, a first model included or utilized by the MMEMS is executed for predicting at least one of a race and gender of persons included in the acquired dataset that are not yet known. According to exemplary aspects, the MMEMS may include or utilize multiple models. Although three models are disclosed as being utilized by the MMEMS in FIG. 4, aspects of the present disclosure are not limited thereto, such that more or less models may be utilized.

In operation 405, a second model included or utilized by the MMEMS is executed for predicting at least one of a race and gender of persons included in the acquired dataset that were unable to be estimated or processed by the first model.

In operation 406, a third model included or utilized by the MMEMS is executed for predicting at least one of a race and gender of persons included in the acquired dataset that were unable to be estimated or processed by the first model and the second model.

In an example, at least one of the models utilized by the MMEMS may be a Bayesian based model. The models utilized may also include at least one artificial intelligence (AI) or machine learning (ML) model. In an example, the models utilized by the MMEMS may include BISG, BIFSG (new Bayesian Improved First Name Surname Geocoding), and BI-LSTM (bidirectional long-short term memory). However, aspects of the present disclosure are not limited thereto, such that different models or combination of models may be utilized.

BISG may refer to a Bayesian method using the census demographic information associated with surname and the geographic areas where individuals reside to construct race estimates. BISG equation may be represented as provided below:

$$p(r \mid s, g) = \frac{p(r \mid s) * p(g \mid r)}{\sum p(r \mid s) * p(g \mid r)}$$

In the above noted equation, s=surname, g=geography and r=race. By implementing the BISG equations on these inputs, BISG posterior probabilities may be obtained and race estimates based on these posteriors may be calculated. According to exemplary aspects, in making race classifications, a max threshold rule (e.g., a 90 max threshold rule) may be applied on the probabilities. For example, the 90 max threshold rule may state that if an individual's posterior probability for white is greater than 0.90, their race is assigned as white. Otherwise, the race with the greatest posterior probability is assigned.

The BIFSG model may also refer to a Bayesian method using demographic information associated with surname and geography in its estimation. BIFSG, however, builds upon BISG, adding demographic information associated with first name as an additional likelihood into the Bayesian equation. According to exemplary aspects, first names may provide more insight to a person's race, especially in the cases of married individuals who share a last name. BIFSG may also use the same threshold rules as BISG. However, aspects of the present disclosure are not limited thereto, such that BIFSG may use a different threshold rule from BISG.

BIFSG equation may be represented as provided below:

$$p(r \mid s, g, f) = \frac{p(r \mid s) * p(g \mid r) * p(f \mid r)}{\sum p(r \mid s) * p(g \mid r) * p(f \mid r)}$$

In the above noted equation, s=surname, g=geography, r=race and f=first name. By consideration of another data field, race estimation or prediction may be more accurate over the BISG method.

According to exemplary aspects, the BIFSG model may precede the BISG model. For example, race predictions to individuals may be assigned based on the BIFSG posterior probabilities. Then, for individuals whose first name information is not sufficient or otherwise unavailable for performing the BIFSG method, the BISG equation may be applied.

Once the Bayesian methods are executed on the acquired data, then one or more AI or ML models may be executed for the remaining data or individuals that have yet to been assigned a predicted or estimated race (e.g., unmatched cases). According to exemplary aspects, a Bayesian based model may make a prediction of a race and/or gender using the data included in the acquired data. However, if a data field is missing or does not correspond to the information included in a reference dataset (e.g., census data), data of the respective person (e.g., surname) may be unable to be processed. Accordingly, in such a situation, race and/or race of the respective person may be unable to be predicted or estimated. For such situations of unmatched case or individual, one or more ML models may be executed for processing of the unmatched case or individual for improved coverage and accuracy.

As exemplarily illustrated in FIG. 6, by using the BISG model alone, an accuracy of 89.14% and a coverage of 68.12% were achieved. In contrast, by sequentially executing the BIFSG model followed by the BISG model, an accuracy of 89.59% and a coverage of 73.33% were achieved. Lastly, by sequentially executing BIFSG model, followed by BISG model and a ML model, respectively, an accuracy of 89.63% and a coverage of 82.30% were achieved. Accordingly, by performing sequential execution of the three models, accuracy of results and coverage of data processing may both be improved.

The AI or ML model may refer to a neural network which takes in a first name, surname, and demographic information related to first, surname and geography. According to exemplary aspects, the AI or ML model may incorporate natural language process (NLP) methods and deep learning. Such a model may estimate cases that are still unclassified after applying both the BIFSG and BISG models. In an example, the thresholds used to make race classifications may be set to achieve a pre-selected precision based on a testing set. By incorporating NLP methods and deep learning allows the AI/ML model to make estimations or predictions in cases where pieces of information necessary to the BISG or BIFSG questions are missing to further enhance coverage of data.

Generally, AI or ML algorithms may be executed to perform data pattern detection, and to provide an output or render a decision based on the data pattern detection. More specifically, an output may be provided based on a historical pattern of data, such that with more data or more recent data, more accurate outputs and/or decisions may be provided or rendered. Accordingly, the ML or AI models may be constantly updated after a predetermined number of runs or iterations. According to exemplary aspects, machine learning may refer to computer algorithms that may improve automatically through use of data. Machine learning algorithm may build an initial model based on sample or training data, which may be iteratively improved upon as additional data are acquired.

More specifically, machine learning/artificial intelligence and pattern recognition may include supervised learning algorithms such as, for example, k-medoids analysis, regression analysis, decision tree analysis, random forest analysis, k-nearest neighbors analysis, logistic regression analysis, k-fold cross-validation analysis, balanced class weight analysis, and the like. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, and the like.

In another exemplary embodiment, the ML or AI model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the ML or AI model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the ML or AI models may be generated using at least one from among an artificial neural network technique, a decision tree technique, a support vector machines technique, a Bayesian network technique, and a genetic algorithms technique.

In operation 407, race estimations or predictions for the acquired data is output. Further, names for which race and/or gender has been estimated, may be stored or updated in storage. For example, for names race and/or gender has been predicted with a predetermined level of confidence may be stored as reference data in the storage. Moreover, the AI or ML model may be updated based on the processed data.

Figure 5:
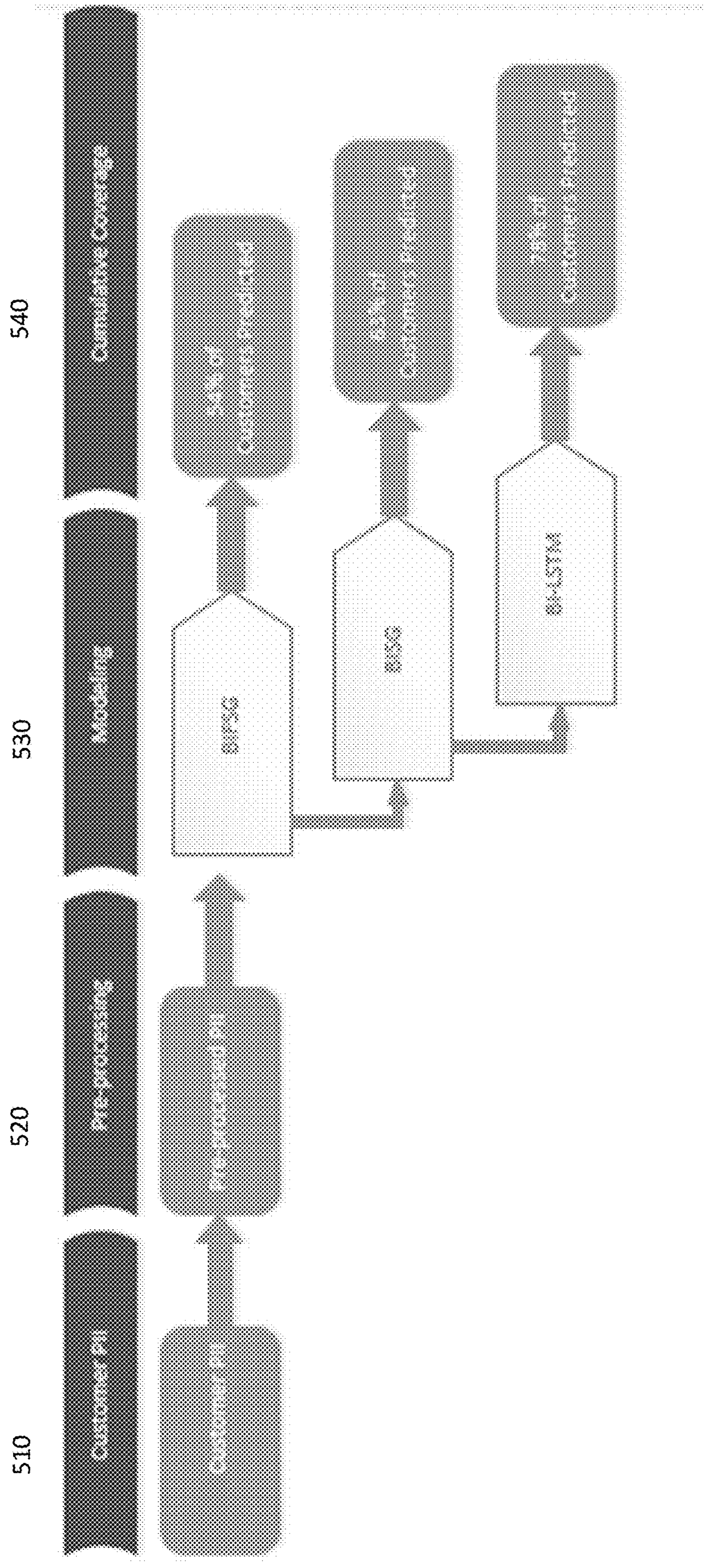
FIG. 5 illustrates a process flow for performing a multi-model data processing for calculating a prediction of race and gender of a customer dataset in accordance with an exemplary embodiment

FIG. 5 illustrates a process flow for performing a multi-model data processing for calculating a prediction of race and gender of a customer dataset in accordance with an exemplary embodiment.

In operation 510, customer PII is acquired for a data set of individuals. In an example, PII may be collected from a variety data sources. Data sources may include privately sourced information, such as information of customers or users, or may be publicly available information, or a combination of both. According to exemplary aspects, the PII acquired may include one or more of a first name, a last name, a pre-fix, a suffix, geographic information and the like. However, aspects of the present disclosure are not limited thereto, such that additional data may be collected.

In operation 520, one or more pre-processing operations are performed on the acquired customer PII. For example, extraneous spacing and/or grammar may be removed. In addition, certain pre-fixes, suffixes, titles (e.g., Dr., Esq., PhD. and the like) may also be removed. Moreover, duplicate data may also be identified and removed from further processing. In another example, users or customers may be grouped according to certain geographic regions or markets. However, aspects of the present disclosure are not limited thereto, such that additional or less pre-processing may be performed on the acquired data. Further, different pre-processing or smoothing operations may be performed for a corresponding model included in the MMEMS.

In operation 530, sequential execution of different models are performed. As exemplarily illustrated in FIG. 5, BIFSG model is first executed, followed by the BISG model, further followed by a BI-LSTM (bidirectional long short term memory) model. According to exemplary aspects, BI-LSTM is an exemplary ML model. However, aspects of the present disclosure are not limited thereto, such that a different ML model may be utilized.

According to exemplary aspects, the three models may perform batch processing of the acquired data set. Alternatively, the three models may be executed contemporaneously or in a staggered manner, such that when an individual within the dataset is unable to be processed by BIFSG, the respective individual is immediately processed by the BISG model while BIFSG is still being executed or the remaining dataset. Likewise, an individual that is unable to be processed by BIFSG and BISG, the respective individual may be immediately processed by the BI-LSTM model while one or both of the BIFSG and BISG models are being executed.

Operation 540 performs calculation of the cumulative coverage as individuals included in the acquired dataset are being processed by the three models. As illustrated in FIG. 5, 54% of data coverage may be achieved by BIFSG alone, whereas 63% of data coverage is achieved by processing by a combination BIFSG and BISG, and 78% of data coverage is achieved by processing by a combination of BIFSG, BISG and BI-LSTM.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing sequential multi-model race estimation, the method comprising:

performing, using a processor and a memory:

acquiring, over a network, a dataset of identification information of a plurality of individuals;

performing smoothing of the dataset by removing at least one of pre-fixes, suffixes and titles from further processing by a multi-model system;

executing a first model within the multi-model system for estimating a race for each of the plurality of individuals included in the dataset, wherein the first model is a rule-based model;

subsequent to executing the first model, executing a second model within the multi-model system for estimating a race for individuals included in the dataset that were unable to be estimated via the first model, wherein the second model is a Bayesian based model that connects with a network server to utilize census demographic and geographic information associated with the identification information of the individuals included in the dataset that were unable to be estimated via the first model; and subsequent to executing the second model, executing a third model within the multi-model system for estimating a race for individuals included in the dataset that were unable to be estimated via the first model and the second model, wherein the third model is an artificial intelligence (AI) model that is selectively invoked when the first model and the second model together are unable to estimate the race for all of the individuals included in the dataset, wherein the third model estimates a race for individuals with insufficient data fields;

storing the race of the individuals estimated by the first model, the second model and the third model; and updating the third model based on the stored race of the individuals estimated by the first model, the second model and the third model.

2. The method according to claim 1, further comprising performing one or more pre-processing operations on the dataset of identification information of the plurality of individuals.

3. The method according to claim 1, wherein the second model is being executed prior to completion of the first model.

4. The method according to claim 1, wherein the third model is being executed prior to completion of the second model.

5. The method according to claim 1, wherein the second model is executed upon completion of the first model.

6. The method according to claim 1, wherein the third model is executed upon completion of the second model.

7. The method according to claim 1, wherein the first model is unable to estimate a race for individuals with insufficient data fields.

8. The method according to claim 1, wherein the second model is unable to estimate a race for individuals with insufficient data fields.

9. The method according to claim 1, wherein the first model requires more data fields than the second model for performing the estimating.

10. The method according to claim 1, wherein accuracy and coverage of an estimate provided by the first model are improved upon execution of the second model.

11. The method according to claim 1, wherein accuracy and coverage of an estimate provided by the second model are improved upon execution of the third model.

12. A system to perform sequential multi-model race estimation, the system comprising:

at least one processor;

at least one memory; and at least one communication circuit, wherein the at least one processor performs:

acquiring, over a network, a dataset of identification information of a plurality of individuals;

performing smoothing of the dataset by removing at least one of pre-fixes, suffixes and titles from further processing by a multi-model system;

executing a first model within the multi-model system for estimating a race for each of the plurality of individuals included in the dataset, wherein the first model is a rule-based model;

subsequent to executing the first model, executing a second model within the multi-model system for estimating a race for individuals included in the dataset that were unable to be estimated via the first model, wherein the second model is a Bayesian based model that connects with a network server to utilize census demographic and geographic information associated with the identification information of the individuals included in the dataset that were unable to be estimated via the first model; and subsequent to executing the second model, executing a third model within the multi-model system for estimating a race for individuals included in the dataset that were unable to be estimated via the first model and the second model, wherein the third model is an artificial intelligence (AI) model that is selectively invoked when the first model and the second model together are unable to estimate the race for all of the individuals included in the dataset, wherein the third model estimates a race for individuals with insufficient data fields;

storing the race of the individuals estimated by the first model, the second model and the third model; and updating the third model based on the stored race of the individuals estimated by the first model, the second model and the third model.

13. A non-transitory computer readable storage medium that stores a computer program for performing sequential multi-model race estimation, the computer program, when executed by a processor, causing a system to perform a process comprising:

acquiring, over a network, a dataset of identification information of a plurality of individuals;

performing smoothing of the dataset by removing at least one of pre-fixes, suffixes and titles from further processing by a multi-model system;

executing a first model within the multi-model system for estimating a race for each of the plurality of individuals included in the dataset, wherein the first model is a rule-based model;

subsequent to executing the first model, executing a second model within the multi-model system for estimating a race for individuals included in the dataset that were unable to be estimated via the first model, wherein the second model is a Bayesian based model that connects with a network server to utilize census demographic and geographic information associated with the identification information of the individuals included in the dataset that were unable to be estimated via the first model; and subsequent to executing the second model, executing a third model within the multi-model system for estimating a race for individuals included in the dataset that were unable to be estimated via the first model and the second model, wherein the third model is an artificial intelligence (AI) model that is selectively invoked when the first model and the second model together are unable to estimate the race for all of the individuals included in the dataset, wherein the third model estimates a race for individuals with insufficient data fields;

storing the race of the individuals estimated by the first model, the second model and the third model; and updating the third model based on the stored race of the individuals estimated by the first model, the second model and the third model.

* * * * *